(12) United States Patent
Virtanen et al.

(10) Patent No.: US 11,106,964 B2
(45) Date of Patent: Aug. 31, 2021

(54) RFID LABEL AND USE

(71) Applicant: Confidex Oy, Tampere (FI)

(72) Inventors: Juha Virtanen, Tampere (FI); Heikki Ahokas, Tampere (FI)

(73) Assignee: CONFIDEX OY, Tampere (FI)

( * ) Notice: Subject to any disclaimer, the term of this patent is extended or adjusted under 35 U.S.C. 154(b) by 0 days.

(21) Appl. No.: 16/967,877

(22) PCT Filed: Feb. 22, 2018

(86) PCT No.: PCT/FI2018/050130
§ 371 (c)(1),
(2) Date: Aug. 6, 2020

(87) PCT Pub. No.: WO2019/162556
PCT Pub. Date: Aug. 29, 2019

(65) Prior Publication Data
US 2021/0049437 A1     Feb. 18, 2021

(51) Int. Cl.
*G06K 19/06*       (2006.01)
*G06K 19/077*      (2006.01)

(52) U.S. Cl.
CPC ... *G06K 19/0776* (2013.01); *G06K 19/07786* (2013.01); *G06K 19/07794* (2013.01)

(58) Field of Classification Search
CPC ......... G06K 19/07749; G06K 19/0723; G06K 7/0008; G06K 19/0775; G06K 19/07773; G06K 19/077; G06K 19/07769; G06K 19/07794; G06K 7/10336; G06K 7/10316; G06K 19/07758; G06K 19/07783; H01Q 1/2225; H01Q 7/00; G06Q 20/341
USPC ......................... 235/380, 439, 451, 487, 492
See application file for complete search history.

(56) References Cited

U.S. PATENT DOCUMENTS

| | | | |
|---|---|---|---|
| 2006/0061475 | A1 | 3/2006 | Moskowitz et al. |
| 2006/0145861 | A1 | 7/2006 | Forster et al. |
| 2008/0252460 | A1 | 10/2008 | Stobbe |
| 2008/0277483 | A1* | 11/2008 | Ho ................... G06K 19/07749 235/492 |
| 2009/0085750 | A1* | 4/2009 | Waldner ............... H01Q 1/2208 340/572.7 |
| 2013/0119144 | A1 | 5/2013 | Suzuki |

FOREIGN PATENT DOCUMENTS

JP        2008072437        3/2008

* cited by examiner

*Primary Examiner* — Jamara A Franklin
(74) *Attorney, Agent, or Firm* — Leason Ellis LLP

(57) ABSTRACT

An arrangement of a RFID label (100), the RFID label comprising a chip (3), an antenna (1) coupled to the chip, an RFID inlay (6), and an antenna extender label (7), the antenna extender label being attached to the RFID inlay, and comprising an extender antenna (8), and a RF coupling element (9) arranged to couple with the antenna. At least part of the antenna extender label is attached removably to the RFID inlay such that the extender antenna is detachable from the RFID label without destroying the transmission capability of the antenna.

13 Claims, 2 Drawing Sheets

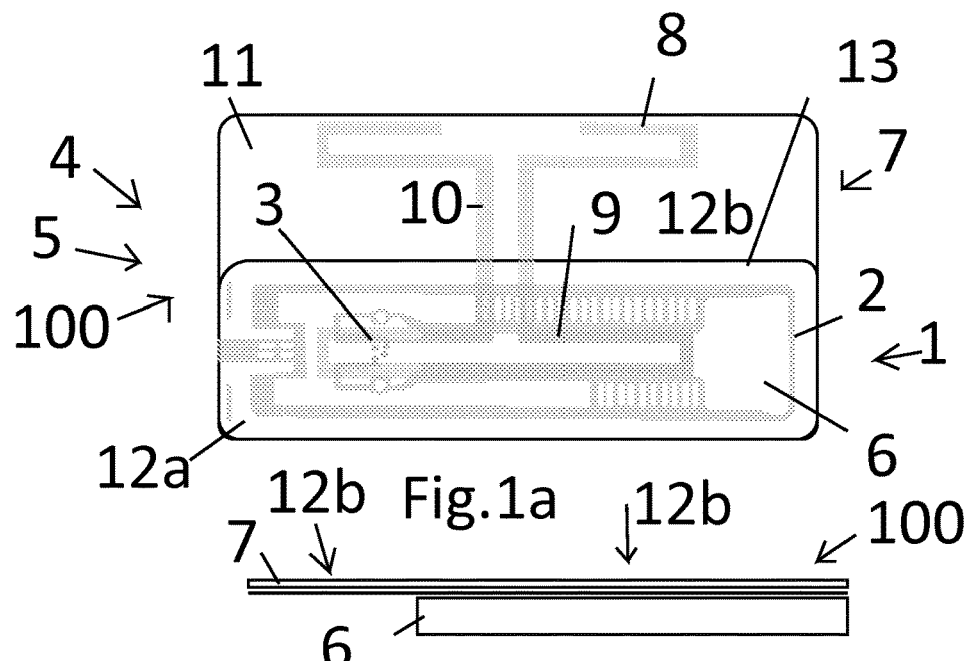
Fig. 1a
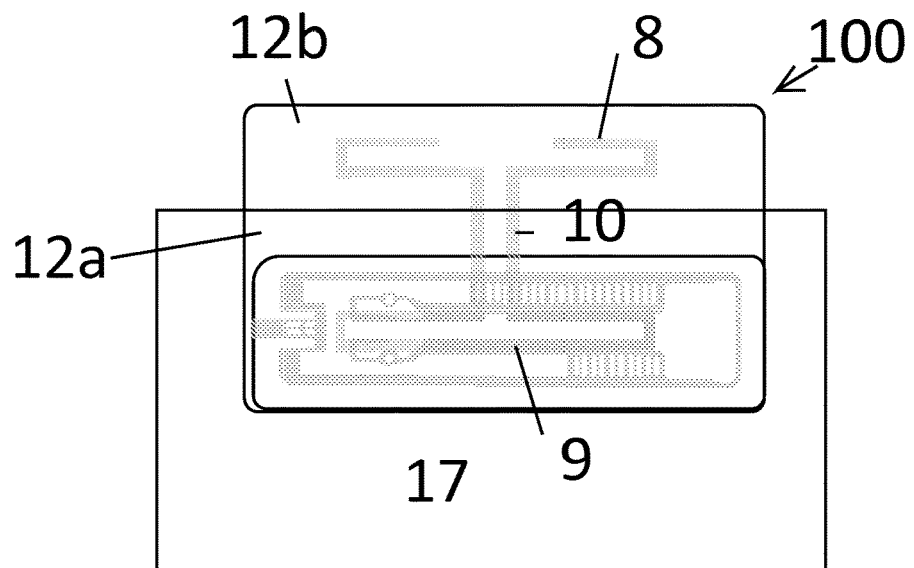
Fig. 1b
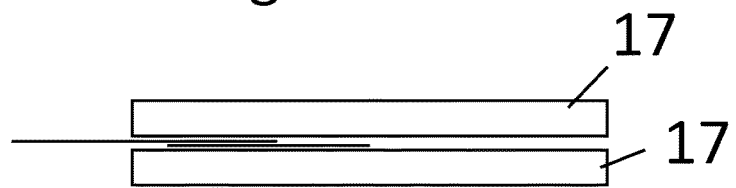
Fig. 2a
Fig. 2b

RFID LABEL AND USE

CROSS-REFERENCE TO RELATED PATENT APPLICATIONS

This application is a U.S. National Phase Application under 35 U.S.C. § 371 of International Patent Application No. PCT/FI2018/050130, filed Feb. 22, 2018, which is incorporated by reference as if expressly set forth in its entirety herein.

BACKGROUND

The invention relates to an arrangement of a RFID label. The invention further relates to use of the arrangement.

The use and reading distance of RFID (Radio Frequency Identification) label antennas are heavily affected by conductive materials. For instance, if a dipole antenna is placed between two sheets of conductive material, the antenna is effectively short circuited and thus it is not able to receive any RF (Radio Frequency) energy. The same problem concerns also on-metal RFID label antennas. They are able to operate on top of a metal sheet, but once a conductive sheet is placed on top of the RFID label the antenna becomes short circuited.

BRIEF DESCRIPTION

Viewed from a first aspect, there can be provided an RFID label, comprising a chip, an antenna coupled to the chip, an RFID inlay, and an antenna extender label, the antenna extender label being attached to the RFID inlay, and further comprising an extender antenna, and a RF coupling element arranged to couple with the antenna, wherein at least part of the antenna extender label is attached removably to the RFID inlay such that the extender antenna is detachable from the RFID label without destroying the transmission capability of the antenna.

Thereby products comprising conductive material and packed or stacked may be identified.

The RFID label is characterised by what is stated in claim 1. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

BRIEF DESCRIPTION OF FIGURES

Some embodiments illustrating the present disclosure are described in more detail in the attached drawings, in which FIG. 1a is a schematic top view of an RFID label according to the invention in partial cross-section, FIG. 1b is a schematic side view of the RFID label shown in FIG. 1a in partial cross-section, FIGS. 2a and 2b are schematic views of the RFID label shown in FIGS. 1a and 1b arranged in skis.

In the figures, some embodiments are shown simplified for the sake of clarity. Similar parts are marked with the same reference numbers in the figures.

DETAILED DESCRIPTION

Figure 3:
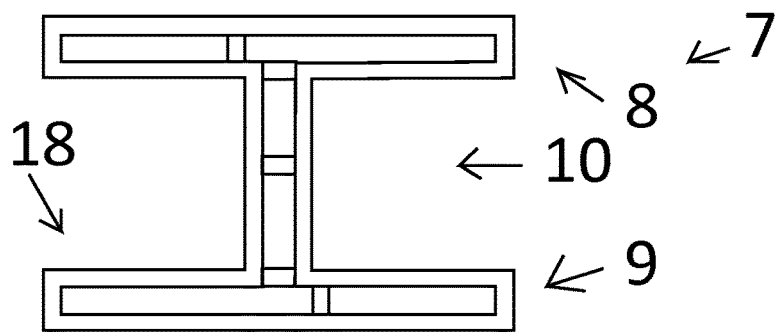
FIG. 3 is a schematic top view of a detail of an RFID label according to the invention.

FIG. 1a is a schematic top view of an RFID label according to the invention in partial cross-section, and FIG. 1b is a schematic side view of the RFID label shown in FIG. 1a in partial cross-section.

The RFID label 100 is a layered structure that comprises an antenna 1, a radiating element 2 of the antenna and an IC (integrated circuit) 3. The RFID label 100 may further comprises—depending on the type of the antenna 1—a ground plane 4 that is made of metal or some other electrically conductive material or composition.

Layers of the RFID label 100 are typically attached together with suitable adhesive layers and sealed by e.g. a silicone liner. The RFID label 100 may be of non-metal or on-metal type.

The antenna 1 and the IC 4 (together with further electronic components, if any) are arranged to a structural module such as an inlay 6 made of a dielectric material.

The RFID label 100 may further comprise a spacer layer 5 that is arranged to make distance between the antenna 2 and the ground plane 4. The spacer layer 5 is made of a dielectric material, such as polyethylene PE, polypropylene PP polyethylene terephthalate PET, in a solid or a foamed form.

Furthermore, the RFID label 100 comprises an antenna extender label 7 attached on the RFID inlay 6. The antenna extender label 7 may comprise an extender inlay 11 that is made of a dielectric material, e.g. of the same or similar material as the RFID inlay 6. Additionally, the antenna extender label 7 comprises an extender antenna 8, and a RF (Radio Frequency) coupling element 9 arranged to couple with the antenna 1. Furthermore, the antenna extender label 7 may comprise a transmission element 10 arranged to extend the distance between the extender antenna and the RF coupling element and to transmit RF energy between the extender antenna 8 and the RF coupling element 9.

In an embodiment, the antenna extender label 7 is construed without the extender inlay, but the extender antenna 8 is a self-supporting element the mechanical structure of which is sturdy enough without any supporting structure(s). The self-supporting extender antenna 8 may be manufactured from e.g. metal sheet or metal wire.

The extender antenna 8, the RF coupling element 9 and the transmission element 10 are made of an electrically conductive material or composition, typically of metal.

The extender antenna 8 captures RF energy sent by a RFID reader (not shown). The transmission element 10 transfers the received energy to the coupling element 9 that, in turn, transfers the energy to the IC 3.

In an embodiment, the coupling element 9 transfers the energy to the antenna 1 coupled to the IC 3.

The antenna extender label 7 or the extender label 11 thereof is attached to the RFID inlay 6 such that the extender antenna 8 can be removed from the RFID label without destroying the RF transmission capability of the antenna 1.

Thus, the antenna extender label 7 can be removed when it does not have any purpose.

In an embodiment, e.g. shown in FIG. 1a, the antenna extender label 7 comprises an attaching part 12a attached permanently to the RFID inlay 6, and a removable part 12b that is detachably attached to the attaching part 12a. The attaching part 12a may be e.g. glued or welded to the RFID inlay 6.

The extender antenna 8 is included in the removable part 12b of the extender label. That is to say, as soon as the removable part 12b is detached from the attaching part 12a, the extender antenna 8 is detached from the RFID label 100. The attaching part 12a does not affect adversely read performance of the RFID label 100.

In an embodiment, there is a perforation line 13 between the removable part 12b and the attaching part 12a. The perforation line renders the structure of the antenna extender label 7 weakened. This way the perforation line 13 facilitates removing the removable part 12b and ensures the removable part 12b engaging correctly and a predetermined way from the RFID label 100. It is to be noted, however, that said correct and predetermined engaging may also be ensured by some other means or structures, such as a thinned material thickness of the antenna extender label between the attaching part 12a and the removable part 12b, etc.

In still another embodiment, the antenna extender label 7 is adhered by a low tack adhesive or a removable adhesive on the RFID inlay 6. Thus, the antenna extender label 7 may be unfastened from the RFID inlay 6 such that the RFID inlay 6 is not damaged.

The "low tack adhesive" means here that the extender label 7 can be removed with little effort. The "removable adhesive" means here that the extender label 7 can be removed cleanly but with a bit of force.

According to an aspect of the invention, the antenna 1 is a dipole antenna. According to another aspect of the invention, the antenna 1 is PIFA (Planar Inverted-F Antenna) or IFA (Inverted-F Antenna). These types of antenna are known per se and thus they are not described more detailed herein.

In an embodiment, the RF coupling element 9 comprises a coil 14, whereby the coupling between the RF coupling element 9 and the antenna 1 is an electromagnetic coupling.

In another embodiment, the RF coupling element 9 comprises a conductor element 15, and the coupling between the RF coupling element 9 and the antenna 1 is a capacitive coupling. The conductor element 15 may comprise one or more opening (not shown) for optimizing the capacitive coupling. However, the conductor element may be without any opening.

In still another embodiment, the RF coupling element 9 comprises a dipole element 16, and the coupling between the RF coupling element 9 and the antenna 1 is an electromagnetic coupling. The dipole element 16 may consist of two conductive arms, as shown in Figure.

The RF coupling element 9 shown in FIG. 1a is a folded dipole.

The antenna extender label 7 has a passive and simple structure, and low manufacturing costs. The antenna extender label 7 does not impede assembling the RFID label 100, thus the RFID label is easy and fast to assemble to the product to be identified.

Skis, such as cross-country skis, slalom skis etc., are an example of the products to be identified by using the RFID label 100. When skis have been packaged in a stack, the RFID label attached on upper surface of the ski laying inside the stack is overlapped by next ski.

Especially slalom skis comprise, but also another type of skis may comprise, a structural layer comprising metal. This layer effectively impedes or even makes it totally impossible to read a RFID label that does not comprise antenna extender label 7. Thus the skis inside the package cannot be identified. This problem can be solved by using the RFID labels 100 according to the invention. The antenna extender labels 7 attached in skis stick out from the package, being thus not overlapped by any ski. Thus all the skis can be identified by a RFIF reader. The antenna extender label 7 may be removed when skis are taken out from the package.

Not only skis but also ski boards and similar sports equipment that are packaged in a stack may be identified with the RFID label 100 according to the invention.

According to an aspect, the product to be identified may be an electronic component, such as server/network switches that are stacked while being transported from a factory to a customer. These products are in close contact in the stack and therefore their tagging is very challenging when conventional RFID tags are used. This problem is solved by using the RFID labels 100 according to the invention.

According to an aspect, the product to be identified may be a sheet of metal or other conductive/lossy material. Stacks of such material, i.e. two or more objects made of such material and stacked can be identified by using the RFID labels 100 according to the invention.

According to an aspect, the antenna extender label 7 may also boost the reading range of the RFID label 100, if not removed from the RFID label 100. For instance, the antenna extender label 7 may work as a read range booster for on-metal RFID labels while they are applied on a dielectric (such as plastic) surface of a product.

EXAMPLES

A package of slalom skis was stacked such that there was a 10 mm ski separation between adjacent skis. By using RFID labels 100 comprising an antenna extender label 7 that extends from the side of the ski for about 20 mm, the reading range was increased from 1 meter to 4 meters.

Another package of slalom skis was stacked such that there was a 20 mm ski separation between adjacent skis. By using RFID labels 100 comprising an antenna extender label 7 that extends from the side of the ski for about 20 mm, the reading range was increased from 1.5 meter to 7 meters.

A third package of slalom skis was stacked such that adjacent skis were in contact to each other, i.e. their distance was 0 mm. By using RFID labels 100 comprising an antenna extender label 7 that extends from the side of the ski for about 20 mm, the reading range was 1 meter. By contrast, the skis provided with RFID labels without the antenna extender label were not able to be identified at all.

As a conclusion, although the antenna 1 is short circuited between two layers of a conductive material, the RFID labels 100 are readable thanks to the antenna extender label 7.

FIGS. 2a and 2b are schematic views of the RFID label shown in FIGS. 1a and 1b attached in a ski 17 that is arranged in a stack of skis. The RFID label 100 is attached to the ski 17 such that the antenna extender label 7 and the extender antenna 8 thereof extends past the side of the ski 17 by a distance E. Said distance E may be e.g. 10 mm-50 mm.

FIGS. 3-6 are schematic top views of geometries of RFID labels according to the invention.

In FIG. 3, the extender antenna 8 as well as the RF coupling element 9 are loop-like elements 18 that are connected by a transmission element 10 comprising two parallel conductors.

Figure 4:
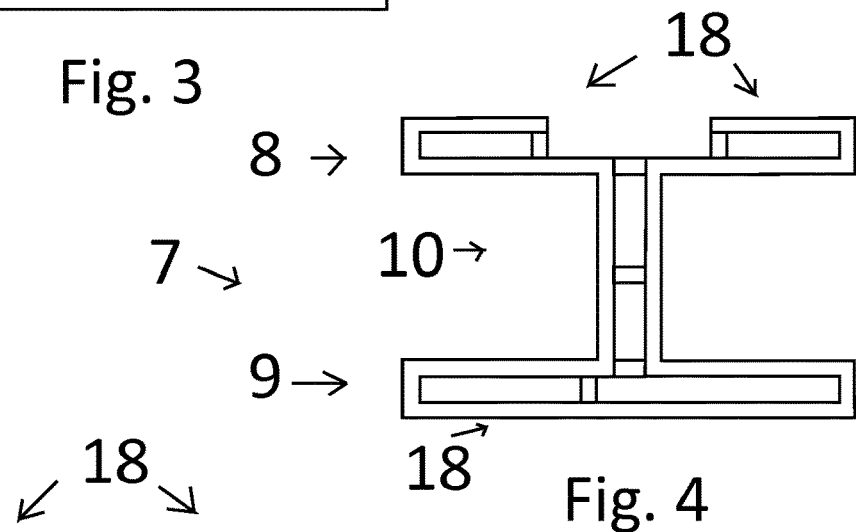
FIG. 4 is a schematic top view of a detail of another RFID label according to the invention.

FIG. 4 is showing a geometry where the extender antenna 8 comprises two conductive loops 18, and the RF coupling element 9 comprises just one loop 18.

Figure 5:
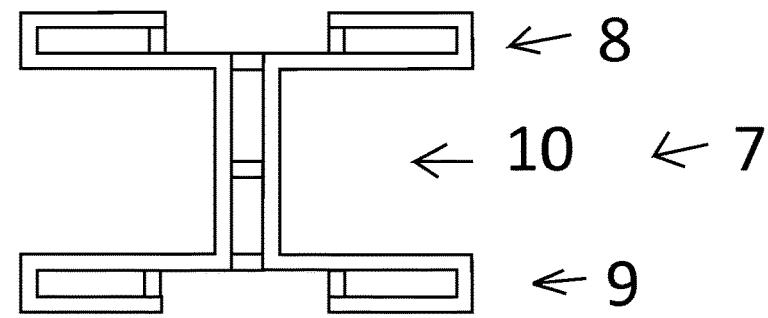
FIG. 5 is a schematic top view of a detail of a third RFID label according to the invention.

In FIG. 5, both the extender antenna 8 as well as the RF coupling element 9 comprise two conductive loops 18.

Figure 6:
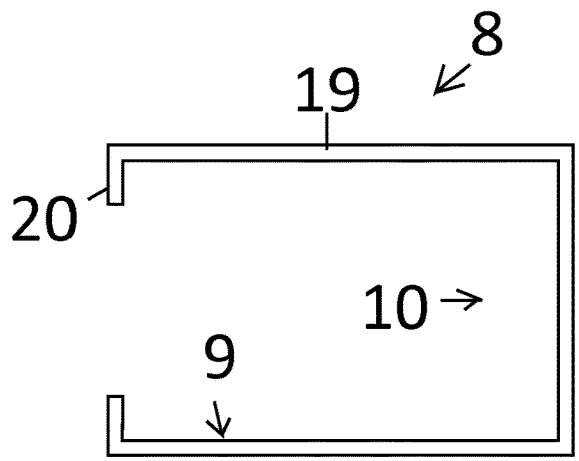
FIG. 6 is a schematic top view of a detail of a fourth RFID label according to the invention.

FIG. 6 is showing a geometry where the extender antenna 8 comprises a straight line 19 of a conductive material, and an orthogonal extension 20 at the distal end of the straight line 19. Also the RF coupling element 9 has a geometry of a straight line and an orthogonal extension. The transmission element 10 is a simple conductive line.

It is to be noted, however, that the geometries include in the antenna extender label 7 may vary in numerous ways. The geometry may be a combination of the details shown in FIGS. 3-6, or some other geometries not shown in the Figures.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS 1 antenna
2 radiating element
3 IC
4 ground plane
5 spacer layer
6 RFID inlay
7 antenna extender label
8 extender antenna
9 RF coupling element
10 transmission element
11 extender inlay
12a, b parts of antenna extender label
13 perforation line
14 coil
15 conductor element
16 dipole element
17 ski
18 loop
19 straight line
20 orthogonal extension
100 RFID label
E amount of extension

The invention claimed is:

1. An arrangement of an RFID label,
the RFID label comprising
a chip,
an antenna coupled to the chip,
an RFID inlay, and
an antenna extender label, the antenna extender label being attached to the RFID inlay, and comprising
an extender antenna, and
an RF coupling element arranged to couple with the antenna,
wherein at least part of the antenna extender label is attached removably to the RFID inlay such that the extender antenna is detachable from the RFID label without destroying the transmission capability of the antenna.

2. The arrangement as claimed in claim 1, wherein the antenna extender label is adhered by a low tack adhesive on the RFID inlay.

3. The arrangement as claimed in claim 1, wherein the antenna extender label comprises an attaching part attached permanently to the RFID inlay, and
a removable part being detachably attached to the attaching part, and wherein
the extender antenna is included in the removable part.

4. The arrangement as claimed in claim 3, comprising a perforation line between the removable part and the attaching part.

5. The arrangement as claimed in claim 1, wherein the antenna is a dipole antenna.

6. The arrangement as claimed in claim 1, wherein the antenna is a PIFA or IFA.

7. The arrangement as claimed in claim 1, comprising a transmission element arranged to extend the distance between the extender antenna and the RF coupling element, and for transmitting RF energy between the extender antenna and the RF coupling element.

8. The arrangement as claimed in claim 7, wherein the RF coupling element comprises a coil, and
a coupling between the RF coupling element and the antenna is a magnetic coupling.

9. The arrangement as claimed in claim 7, wherein the RF coupling element comprises a conductor element, and
a coupling between the RF coupling element and the antenna is a capacitive coupling.

10. The arrangement as claimed in claim 9, wherein the conductor element comprises at least one opening for optimizing the capacitive coupling.

11. The arrangement as claimed in claim 7, wherein the RF coupling element comprises a dipole element, and
a coupling between the RF coupling element and the antenna is an electromagnetic coupling.

12. The arrangement as claimed in claim 11, wherein the dipole element consists of two conductive arms.

13. The arrangement as claimed in claim 1, wherein the antenna extender label comprises an extender inlay, being attached to the RFID inlay, and the extender antenna arranged on the extender inlay.

* * * * *